(12) United States Patent
Martinez Mondejar et al.

(10) Patent No.: US 9,147,146 B2
(45) Date of Patent: Sep. 29, 2015

(54) METHOD FOR PRODUCING A CARD BODY, AND CARD BODY

(71) Applicant: GIESECKE & DEVRIENT GMBH, Munich (DE)

(72) Inventors: Emilio Martinez Mondejar, Barcelona (ES); Gemma Redondo, Cornella de Llobregat Barcelona (ES)

(73) Assignee: GIESECKE & DEVRIENT GMBH, Munich (DE)

( * ) Notice: Subject to any disclaimer, the term of this patent is extended or adjusted under 35 U.S.C. 154(b) by 0 days.

(21) Appl. No.: 14/390,333

(22) PCT Filed: Mar. 4, 2013

(86) PCT No.: PCT/EP2013/000650
§ 371 (c)(1),
(2) Date: Oct. 2, 2014

(87) PCT Pub. No.: WO2013/149694
PCT Pub. Date: Oct. 10, 2013

(65) Prior Publication Data
US 2015/0041545 A1    Feb. 12, 2015

(30) Foreign Application Priority Data
Apr. 3, 2012   (DE) .................. 10 2012 006 883

(51) Int. Cl.
*G06K 19/02*   (2006.01)
*G06K 19/077*   (2006.01)
(Continued)

(52) U.S. Cl.
CPC .......... *G06K 19/07722* (2013.01); *B32B 3/266* (2013.01); *B32B 3/30* (2013.01); *B32B 5/16* (2013.01); *B32B 5/30* (2013.01); *B32B 7/12* (2013.01); *B32B 19/02* (2013.01); *B32B 19/045* (2013.01); *B32B 19/048* (2013.01); *B32B 27/08* (2013.01); *B32B 27/14* (2013.01);
(Continued)

(58) Field of Classification Search
USPC .................. 235/488, 492, 451; 428/347, 349
See application file for complete search history.

(56) References Cited

U.S. PATENT DOCUMENTS 4,472,227 A   9/1984   Toyoda et al.
4,879,153 A   11/1989   Ohashi et al.
(Continued)

FOREIGN PATENT DOCUMENTS

EP   0920056 A2   6/1999
EP   0945244 A1   9/1999
WO   2007016148 A2   2/2007

OTHER PUBLICATIONS

International Preliminary Report on Patentability for corresponding International PCT Application No. PCT/EP2013/000650, Oct. 7, 2014.
(Continued)

*Primary Examiner* — Ahshik Kim
(74) *Attorney, Agent, or Firm* — Workman Nydegger

(57) ABSTRACT

A method for manufacturing a multilayer card body for a portable data carrier includes the steps of: making available two layers of synthetic paper, making available at least one cover layer of plastic, printing the upper side of the layers of synthetic paper with a graphical pattern by a screen printing or offset printing process, bringing together the layers into a half-product, laminating the layers together under conditions typical of chip cards, separating the card body from the half-product by means of a separating tool.

13 Claims, 2 Drawing Sheets

(51) Int. Cl.
- B32B 5/16 (2006.01)
- B32B 5/30 (2006.01)
- B32B 7/12 (2006.01)
- B32B 19/02 (2006.01)
- B32B 19/04 (2006.01)
- B32B 27/08 (2006.01)
- B32B 27/14 (2006.01)
- B32B 27/20 (2006.01)
- B32B 27/30 (2006.01)
- B32B 27/32 (2006.01)
- B32B 27/36 (2006.01)
- B32B 3/26 (2006.01)
- B32B 3/30 (2006.01)
- B32B 38/00 (2006.01)
- B42D 25/00 (2014.01)
- B32B 37/24 (2006.01)
- B32B 38/10 (2006.01)
- B32B 37/12 (2006.01)
- B32B 38/04 (2006.01)
- B42D 25/47 (2014.01)

(52) U.S. Cl.
CPC .............. B32B 27/20 (2013.01); B32B 27/304 (2013.01); B32B 27/32 (2013.01); B32B 27/36 (2013.01); B32B 37/1284 (2013.01); B32B 37/24 (2013.01); B32B 38/10 (2013.01); B32B 38/145 (2013.01); B42D 25/00 (2014.10); *B32B 37/12* (2013.01); *B32B 2037/243* (2013.01); *B32B 2038/042* (2013.01); *B32B 2250/02* (2013.01); *B32B 2250/04* (2013.01); *B32B 2250/24* (2013.01); *B32B 2255/12* (2013.01); *B32B 2260/025* (2013.01); *B32B 2260/046* (2013.01); *B32B 2264/104* (2013.01); *B32B 2305/342* (2013.01); *B32B 2307/20* (2013.01); *B32B 2307/4023* (2013.01); *B32B 2307/412* (2013.01); *B32B 2307/414* (2013.01); *B32B 2307/75* (2013.01); *B32B 2309/02* (2013.01); *B32B 2309/12* (2013.01); *B32B 2317/12* (2013.01); *B32B 2425/00* (2013.01); *B42D 25/47* (2014.10); *B42D 2033/04* (2013.01); *B42D 2033/28* (2013.01); *B42D 2033/46* (2013.01)

(56) References Cited

U.S. PATENT DOCUMENTS

| | | | |
|---|---|---|---|
| 6,641,914 B2 * | 11/2003 | Lu | 428/355 AC |
| 7,018,688 B2 * | 3/2006 | Shepherd | 428/32.17 |
| 2004/0188996 A1 | 9/2004 | Nitta et al. | |

OTHER PUBLICATIONS

International Search Report for corresponding International PCT Application No. PCT/EP2013/000650, May 28, 2013.

* cited by examiner

METHOD FOR PRODUCING A CARD BODY, AND CARD BODY

FIELD OF THE INVENTION

This invention relates to the manufacture of a card body for portable data carriers which is based on a synthetic paper. In particular, the invention relates to the manufacture of card bodies for portable data carriers in the credit-card or chip-card format.

Card-shaped portable data carriers in the credit-card format are widespread. They are used in particular as payment cards or identification cards or, in smaller formats, as authentication cards or memory cards. Most of the cards are equipped with a magnetic strip and/or a microprocessor as well as a data interface for reading devices which enable data-processing tasks to be carried out with the help of the card. The microprocessor ICs are designed to be especially tamper-resistant through a very small overall size, among other things, but have very restricted computing power in comparison to common standard microprocessors e.g. for PCs, so that they have limited resources. Cards of the stated type normally have no, or at most a reduced, user interface with few elements, e.g. in the form of a one-line display screen and/or a small number of keys and/or a sensor for capturing a biometric feature. The manufacture of cards of the above-mentioned type is likewise well enough known, e.g. from "Handbuch der Chipkarten", W. Rankl, W. Effing, 5th edition, 2008, Karl Hanser Verlag, Munich, or the book "Vom Plastik zur Chipkarte", T. Tarantino, Y. Haghiri, 1999, Karl Hanser Verlag, Munich. By a common manufacturing method the cards are thus constructed from a plurality of layers which are interconnected by lamination. The layers typically consist of plastic. Usual plastics are in particular PVC, polycarbonate or plastics based on polyester. It is also known to manufacture cards from paper.

BACKGROUND

With known materials, cards can be manufactured for many requirements. Nevertheless, there is a fundamental desire to continually increase the spectrum of possible card constructions, in order to accordingly increase the spectrum of satisfiable requirements.

From EP 945244 A1 there is known a method for manufacturing a synthetic paper which is especially environmentally friendly. The manufactured synthetic paper consists, based on weight, of 56% to 80% inorganic grit, in particular calcium carbonate, and contains, based on weight, a content of 18% to 43% polyethylene, in particular high-density polyethylene.

From U.S. Pat. No. 4,879,153 A there is known an IC card constructed from a plurality of laminated layers, which has a core structure consisting of a plurality of rigid PVC layers with a cavity in which an IC module is disposed. For improving the bending strength of the card, layers of synthetic paper are furthermore formed on one or both sides of the core structure. The total thickness thereof preferably amounts to up to one third of the total card thickness. At least one of the layers of synthetic paper is so disposed that it lies against the underside of the IC module. The known solution is restricted to utilizing the bending-elastic properties of synthetic paper. Since the proposed card consists for the greater part of PVC, it is to be assessed rather critically with regard to its environmental compatibility from today's point of view.

SUMMARY

The object of the invention is to state a card that has environmentally friendly properties and is manufacturable by an environmentally friendly method.

This object is achieved by a method having the features of the main claim. The method according to the invention is characterized in that the plastic content in manufactured card bodies is reduced and the environmental impairments involved in the manufacture of normal paper, such as a considerable water consumption, are avoided. The manufactured cards have a novel feel and appearance and are recognizably distinct from other card constructions. The card bodies can readily satisfy in particular the requirements set by ISO 7810 and are advantageously suited for chip cards. The method according to the invention is based essentially on the unexpected finding that it is possible to use synthetic paper with very similar process conditions as are known for the manufacture of multilayer plastic card bodies. The method can therefore be carried out with common plants. In a preferred embodiment, a cover layer of plastic, preferably of PVC, is applied to at least one outer side of the card-body core.

With reference to the drawing, an exemplary embodiment of the invention will hereinafter be explained more closely.

BRIEF DESCRIPTION OF THE DRAWINGS

There are shown.

DETAILED DESCRIPTION OF VARIOUS EMBODIMENTS

For the following description it will be assumed by way of example that a card body is being manufactured for a portable data carrier in the form of a chip card with conventional outer dimensions according to ISO standard 7810. However, the method can also be used in the same manner for manufacturing portable data carriers with other dimensions. For example, there can also be manufactured in the same manner portable data carriers in the SIM-card format or portable data carriers serving e.g. together with a housing as a USB stick.

Figure 1:
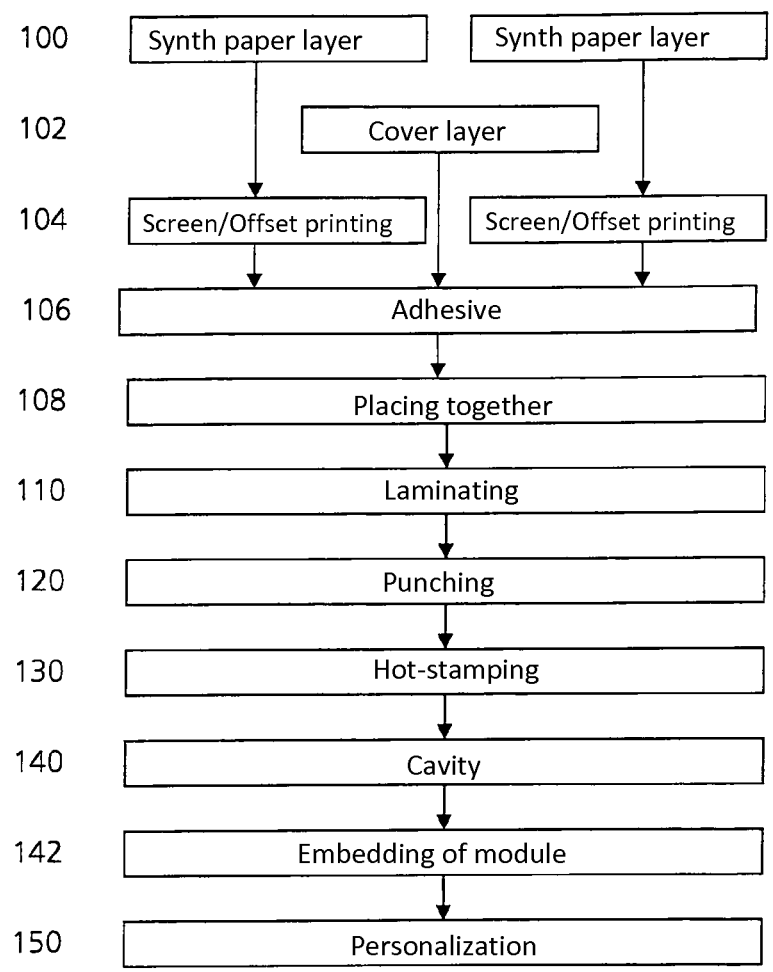
FIG. 1 a flowchart of the manufacture of a card body, and
FIG. 2 a cross section through a card body manufactured according to the method.

The method is illustrated as a flowchart in FIG. 1. It commences with a step 100 by making available two layers 2, 4 of synthetic paper with a thickness of 50 to 400 μm, designated in the Fig. as synth paper layers I and II. The synthetic paper is commercially available, industrial material as is offered e.g. by the company EMANAGREEN, Spain. It typically contains a content of 75 to 80 wt. % mineral powder, in particular calcium carbonate, as well as a content of 20 to 25 wt. % synthetic resin, e.g. high-density polyethylene (HDPE). The ratio of the constituents can vary somewhat, but a ratio of 3:1 is not fallen short of To the synthetic paper can be added small contents of further substances. Expediently, the synthetic paper is made available in sheet form or as a web. The two layers 2, 4 of synthetic paper later form the core structure 10 of a data carrier 1 to be manufactured, as is represented in FIG. 2.

In an expedient embodiment, at least one cover layer 6, 8 is furthermore made available, which can consist e.g. of PVC, step 102. The cover layer 6, 8 preferably consists of a biodegradable plastic, but can in a simple manner also consist of another common plastic, e.g. PVC. It has a thickness of 100 to 600 μm. When PVC or another poorly biodegradable plastic is used, the thickness of a cover layer 6, 8 should not exceed a value of 100 µm. Expediently, the cover layer 6, 8 is transparent.

Figure 2:
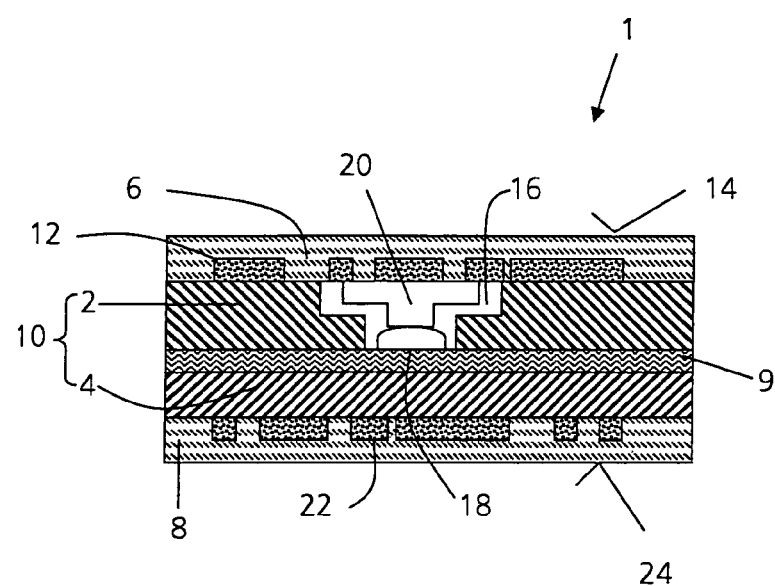

In one variant, there are made available, as shown in FIG. 2, two cover layers 6, 8 which can consist of different materials and have different opacities. For example, one cover layer 6 can consist of PVC and be transparent, while the other cover layer 8 consists of PETG and is semitransparent. The cover layers 6, 8 can be made available as foils which are laminated with the other layers 2, 4. Alternatively, they can also be applied in the form of a lacquer layer, e.g. by a suitable printing method. If the finished data carrier 1 is to possess a magnetic strip, one of the cover layers 6, 8 is expediently equipped with a magnetic strip. The cover layers 6, 8 are optional. They can also be omitted.

In a step 104, a graphical pattern 12, 22 is respectively applied to one side of the layers 2, 4 of synthetic paper by a screen printing or offset printing process or by means of digital printing. The graphical pattern 12, 22 can comprise flat areas, structures and/or alphanumeric characters. The graphical patterns 12, 22 can be of different configuration. The printing step can be executed with conventional printing parameters and printing inks as are used for printing chip cards and credit cards.

In a step 106 there is applied to one, expediently to both, respectively other sides of the layers 2, 4 a thin film of an adhesive supporting the subsequent lamination. The adhesive 9 is preferably made available in the form of an adhesive lacquer. This form will be assumed in the further description. The application of the adhesive lacquer 9 is effected e.g. by screen printing, the thickness of the adhesive-lacquer layer lying below 5 µm. Without adhesive lacquer 9 the two layers 2, 4 would not adhere to each other sufficiently strongly. A suitable adhesive lacquer 9 is obtainable e.g. from the company Polynorma SA, Barcelona, E-08030 Spain, under the designation "Barniz Inter HV X3".

The layers 2, 4 of synthetic paper and the cover layers 6, 8 are disposed one over the other in a sandwich arrangement in a subsequent step 108, so that the layers 2, 4 of synthetic paper between the cover layers 6, 8 and the sides of the layers 2, 4 printed with adhesive lacquer 9 lie against each other. When only one cover layer is present, the layers of synthetic paper are disposed under the cover layer in the same manner.

In this arrangement, the layers 2, 4, 6, 8 are laminated into a half-product in the following step 110. Laminating is done by a conventional laminating method for manufacturing chip cards and credit cards. This method comprises e.g. two heating steps and two cooling steps. The heating steps are effected at temperatures of 130 to 180° C. The pressure in the first heating step amounts to e.g. 10 to 20 bar at a heating time of 1 to 5 min and 60 to 100 bar at a reaction time of 10 to 20 min in the second heating step. The cooling steps are effected at ambient temperature and pressures of 60 to 160 bar. The cooling times lie between 1 and 10 min in the first step, between 5 and 20 min in the second step.

After the step 110 is performed there is obtained a planar, multilayer half-product which has at least a core structure 10 formed from two synthetic paper layers 2, 4 and respectively bearing a graphical pattern 12, 22 on the outer sides. The core structure 10 can moreover be covered on one or both sides with a transparent or translucent cover layer 6, 8. The surfaces 14, 24 of the half-product correspond to the final surfaces 14, 24 of the finished portable data carrier 1, except for a subsequent personalization and/or the incorporation of an IC.

In the following step 120, a card body having the final outer form intended for the data carrier 1 is separated from the planar half-product. Separation is expediently done by punching, but can also be done by cutting or milling.

In a subsequent step 130, hot-stamped elements can be applied to the card body by a conventional hot-stamping method.

If the portable data carrier to be manufactured is a chip card, steps 140, 142 are subsequently effected for creating a cavity in the card body and for inserting a chip module into the produced cavity. However, if the portable data carrier to be manufactured is for example a mere magnetic-strip card or a mere identification card without a microprocessor IC or magnetic strip, the steps 140, 142 are omitted.

The card body present thereafter is finally personalized in a step 150. This is done for example by applying personal data by a thermal transfer process and/or by notching; other per se known personalization methods can likewise be used.

FIG. 2 shows a cross section through data carrier 1 having a card body manufactured according to the method. The thicknesses of the individual layers and elements are not true to scale. The data carrier 1 consists of a core structure 10 which in turn consists of two layers 2, 4 of synthetic paper. The core structure 10 is furnished on both outwardly pointing sides with graphical patterns 12, 22. Over the graphical patterns 12, 22 there is respectively applied a transparent cover layer 6, 8 on both sides. In the upper layer 2 of synthetic paper there is formed a cavity 16 in which an IC module 20 is disposed. The IC module 20 is fixed by means of an adhesive 18 on the bottom and/or on other suitable supporting places of the cavity 16, e.g. on module shoulders formed between a wide and a narrower region of the cavity 16 as indicated in FIG. 2.

Without going beyond the basic idea according to the invention, the hereinabove described method permits a number of modifications and embodiments. In particular, there can be employed instead of two layers 2, 4 of synthetic paper only one such layer. Likewise, it is possible to employ three or more layers of synthetic paper. Over the cover layers 6, 8 there can also be respectively applied further layers. The separating step can further be effected with different separation techniques, e.g. by additional application of a laser or by prepunching the edge contour. The adhesive 9 can further also be made available in a different form from adhesive lacquer.

The invention claimed is:

1. A method for manufacturing a multilayer card body for a portable data carrier having the following steps:
   making available a first and a second layer of synthetic paper, the synthetic paper being based on calcium carbonate to which high-density polyethylene (HDPE) is added, the ratio amounting to at least 3 to 1 based on weight,
   respectively printing a graphical pattern to one side of the layers of synthetic paper,
   applying an adhesive lacquer to at least one side of one of the layers of synthetic paper,
   bringing together the respectively one-sided printed layers of synthetic paper, so that the upper sides with the graphical pattern point outwardly and the side or sides coated with adhesive lacquer lie against each other, so that the adhesive lacquer lies between the layers of synthetic paper,
   laminating the brought-together layers at a temperature of 120 to 180° C., and a pressure of 60 to 100 bar, into a half-product which has a core structure formed from two synthetic paper layers and respectively bearing a graphical pattern on the outer sides,
   separating the card body from the half-product by means of a separating tool.

2. The method according to claim 1, wherein there is formed in the card body a cavity and therein an IC module is disposed, the cavity penetrating at least one synthetic paper layer of the core structure.

3. The method according to claim 1, wherein the layers of synthetic paper possess a thickness of 80 to 400 μm.

4. The method according to claim 1, wherein the adhesive lacquer is applied with a thickness of no more than 5 μm.

5. The method according to claim 1, wherein the graphical pattern is applied by a screen printing or an offset printing process.

6. The method according to claim 1, wherein the separation is effected by punching.

7. The method according to claim 1, wherein at least one cover layer is additionally disposed over the brought-together layers of synthetic paper and laminated as well.

8. The method according to claim 1, wherein the cover layer is a PVC foil.

9. The method according to claim 1, wherein the card body is hot-stamped.

10. A portable data carriers having a multilayer card body which bears a graphical pattern on at least one upper side, wherein the card body has a core structure formed from at least two layers of synthetic paper lying against each other only with the interposition of an adhesive lacquer, the synthetic paper being based on calcium carbonate to which high-density polyethylene (HDPE) is added, the ratio amounting to at least 3 to 1 based on weight.

11. The portable data carrier according to claim 10, wherein the layers of synthetic paper possess a thickness of 80 to 400 μm, and the thickness of the adhesive lacquer amounts to less than 5 μm.

12. The portable data carrier according to claim 10, wherein the card body has a cavity in which an IC module is disposed, the cavity extending into at least one of the layers of synthetic paper.

13. The portable data carrier according to claim 10, wherein the core structure is covered on one or both sides with a transparent or translucent cover layer.

* * * * *